(12) United States Patent
Tezuka

(10) Patent No.: US 9,164,006 B2
(45) Date of Patent: Oct. 20, 2015

(54) ROTATION TABLE WITH CLAMP TORQUE MEASUREMENT UNIT

(71) Applicant: FANUC Corporation, Yamanashi (JP)

(72) Inventor: Hiroki Tezuka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/259,258

(22) Filed: Apr. 23, 2014

(65) Prior Publication Data

US 2014/0318271 A1 Oct. 30, 2014

(30) Foreign Application Priority Data

Apr. 24, 2013 (JP) ................................ 2013-091318

(51) Int. Cl.
*G01L 3/02* (2006.01)
*G01L 3/06* (2006.01)
*B23Q 1/28* (2006.01)

(52) U.S. Cl.
CPC .... *G01L 3/06* (2013.01); *B23Q 1/28* (2013.01)

(58) Field of Classification Search
CPC .................................... G01L 3/06; B23Q 1/28
USPC ................. 73/760, 862.08, 862.321
See application file for complete search history.

(56) References Cited

U.S. PATENT DOCUMENTS

| 4,561,814 | A | * | 12/1985 | Dahlgren et al. ............... 409/80 |
| 4,958,438 | A | * | 9/1990 | Hemmelgarn .................. 33/503 |
| 5,072,651 | A | * | 12/1991 | Kagita .............................. 92/75 |
| 5,107,730 | A | * | 4/1992 | Muraki et al. ................. 82/118 |
| 2010/0119320 | A1 | | 5/2010 | Inoue et al. |

FOREIGN PATENT DOCUMENTS

| EP | 2106878 A1 | 10/2009 |
| JP | 2008-246610 A | 10/2008 |
| JP | 2009248242 A | 10/2009 |

OTHER PUBLICATIONS

Office Action mailed Oct. 7, 2014, corresponding to Japanese patent application No. 2013-091318.

* cited by examiner

*Primary Examiner* — Max Noori
(74) *Attorney, Agent, or Firm* — Hauptman Ham, LLP

(57) ABSTRACT

A rotation instruction is transmitted to a motor in a state where a workpiece placement table connected to a rotation shaft of the motor is clamped by a clamp mechanism provided in a rotation table, and a clamp torque is measured based on motor torque information in accordance with the rotation instruction and a change in rotation shaft state (a rotation position, a rotation speed, and the like).

5 Claims, 9 Drawing Sheets

ROTATION TABLE WITH CLAMP TORQUE MEASUREMENT UNIT

RELATED APPLICATIONS

The present application claims priority to Japanese Application Number 2013-091318, filed Apr. 24, 2013, the disclosure of which is hereby incorporated by reference herein in its entirety.

BACKGROUND OF THE INVENTION

1. Field of the Invention

The present invention relates to a rotation table, and particularly, to a rotation table with a clamp torque measurement unit.

2. Description of the Related Art

In a rotation table of a machine tool, a clamp operation is performed during an index operation so as to hold a rotation shaft. When operations such as an unclamp operation, an index operation, and a clamp operation are repeated, a clamp mechanism is degraded, and hence there is a case in which a necessary clamp torque may not be exhibited. In a case where the necessary clamp torque may not be exhibited, when a rotation load is applied to the rotation shaft, the rotation shaft may not be held, and hence a slip occurs. Thus, the machine tool stops with an alarm generated by the slip, and a workpiece which is being machined becomes a defective product.

Accordingly, there is a need to provide means for periodically measuring the clamp torque of the clamp mechanism so that a deviation in rotation shaft does not occur due to a decrease in clamp torque during the machining. Further, if the clamp torque can be temporarily increased even when a decrease in clamp torque is checked, the machine tool may be used continuously, and hence the sudden stop of the machine tool may be prevented. That is, the maintenance timing may be extended.

A rotation table with a clamp state checking means disclosed in Japanese Patent Application Laid-Open No. 2009-248242 includes oscillation instruction means for repeatedly instructing a normal rotation and a reverse rotation of a direct drive motor, positional deviation information calculation means for calculating positional deviation information based on position information output from a position detector, and determination means for determining a clamp state based on the positional deviation information output from the positional deviation information calculation means. The rotation table causes a slight oscillation operation in the rotation shaft due to a change in torque, and determines whether the clamp operation is completed or not based on the fluctuation range of positional deviation that occurs at that time. However, it should be noted that the rotation table does not accurately measure the clamp torque.

As described above, in the above-described known rotation table with clamp state checking means, the clamp torque needs to be accurately measured. However, as a method of measuring the clamp torque, there is known a method of applying a torque to the rotation shaft from the outside in the rotation direction and measuring the rotational displacement at that time. When the rotation torque increases, the slip occurs at the stage in which the rotation torque becomes larger than the clamp torque, and hence the displacement in the rotation direction increases. Here, it is possible to measure the clamp torque by measuring the changing point of the displacement and the rotation torque at that time.

However, in this method, since a jig for applying the rotation torque from the outside needs to be attached to the rotation table, there is a need to remove a machining jig or a workpiece on the rotation table once. Further, there is a need to perform an operation in which a measurement jig is removed after the measurement and the workpiece and the machining jig are set up again. Here, it is not realistic to remove the workpiece or the machining jig for the measurement of the clamp torque.

SUMMARY OF THE INVENTION

Therefore, the present invention is made in view of the above-described problems, and an object thereof is to provide a rotation table with a clamp torque measurement unit capable of measuring a clamp torque while a workpiece is attached to a workpiece placement table.

According to the invention, there is provided a rotation table including: a workpiece placement table; a motor of which one end of a rotation shaft is connected with the workpiece placement table and the other end thereof is equipped with a detector for detecting the rotation shaft state; a clamp mechanism that holds the workpiece placement table at a stop position; a rotation instruction unit that generates a rotation torque in the motor; a state monitoring unit that monitors a change in rotation shaft state based on the rotation shaft state information output from the detector; and a measurement unit that transmits a rotation instruction to the motor in a state where the workpiece placement table is clamped by the clamp mechanism and measures a clamp torque based on motor torque information in accordance with the rotation instruction and a change in rotation shaft state.

The detector may be a position detector, the state monitoring unit may monitor a change in the rotation position of the rotation shaft, and the measurement unit may measure the clamp torque based on the motor torque information in accordance with the rotation instruction when the rotation position of the rotation shaft changes.

The detector may be a position detector, the state monitoring unit may monitor a change in the rotation positional deviation of the rotation shaft, and the measurement unit may measure the clamp torque based on the motor torque information in accordance with the rotation instruction when the rotation positional deviation of the rotation shaft decreases.

The detector may be a speed detector, the state monitoring unit may monitor a change in the rotation speed of the rotation shaft, and the measurement unit may measure the clamp torque based on the motor torque information in accordance with the rotation instruction when the rotation speed of the rotation shaft changes.

The rotation table may further include an adjustment valve that adjusts a pneumatic pressure and a hydraulic pressure for adjusting the clamp torque based on the clamp torque measurement result of the measurement unit.

According to the invention, it is possible to provide the rotation table with the clamp torque measurement unit capable of measuring the clamp torque while the workpiece is attached to the workpiece placement table.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

Figure 1:
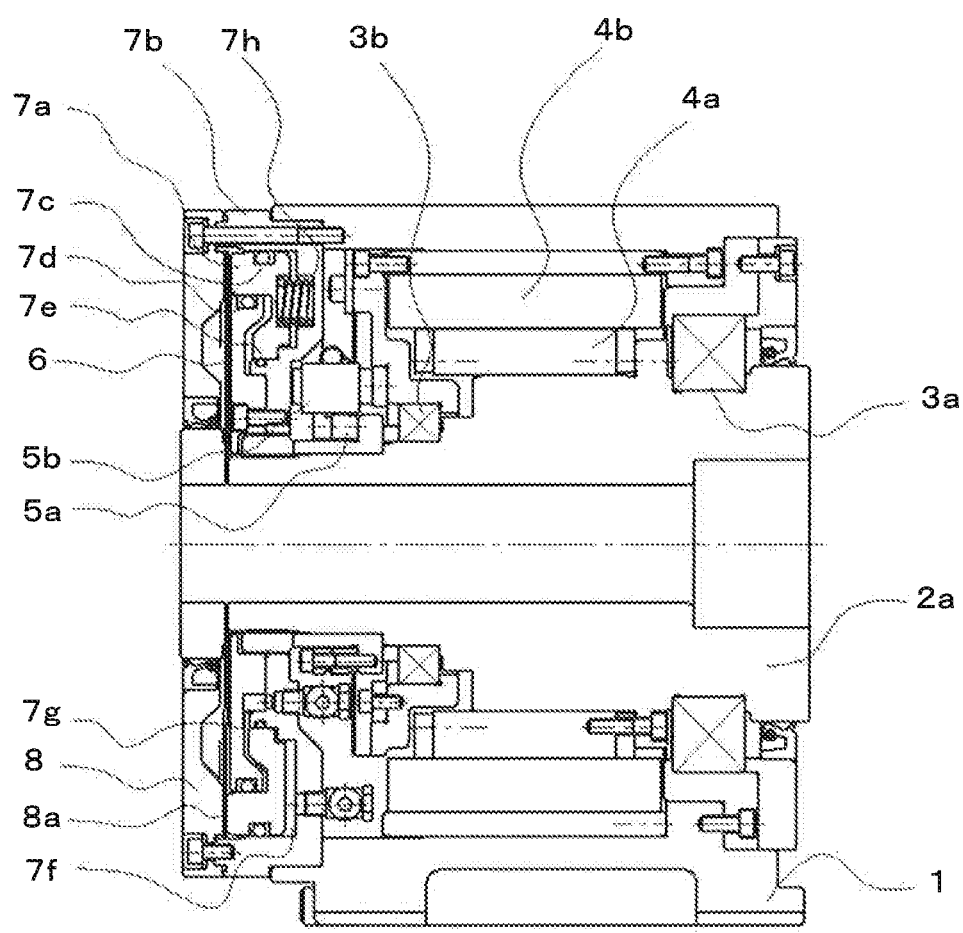
FIG. 1 is a cross-sectional view illustrating a basic structure of a rotation table with a direct drive structure.

FIG. 1 is a cross-sectional view illustrating a basic structure of a rotation table with a direct drive structure. A shaft 2a of a rotation table (not illustrated) is rotatably supported inside a case 1 through a main bearing 3a and a support bearing 3b.

A stator 4b of a motor, a cylinder 7b of a brake, a sensor head 5b, and a lid 8 are fixed to the case. All of a rotor 4a of the motor, a sensor gear 5a, and a disk 6 are fixed to the shaft 2a so as to be rotatable along with the rotation table.

A piston 7a is provided with a stroke capable of advancing and retreating inside the cylinder 7b through seal members 7c, 7d and 7e, and is biased in a direction moving toward the clamp by a plurality of coil springs 7h. Further, an advancing air chamber 7f and a retreating air chamber 7g are formed between the piston 7a and the cylinder 7b so that the piston 7a is movable by compressed air.

In an unclamp state (a clamp release state), compressed air is supplied to the retreating air chamber 7g by an electromagnetic valve which is not illustrated in FIG. 1, so that the piston 7a moves toward the retreat end against the compression force of the coil spring 7h.

In a clamp state, air is discharged from the retreating air chamber 7g and compressed air is supplied to the advancing air chamber 7f by the electromagnetic valve, so that the piston 7a advances and the disk 6 is nipped between the piston and a friction surface 8a on the lid 8.

A: First Embodiment

Embodiment of Measuring Clamp Torque

Figure 2:
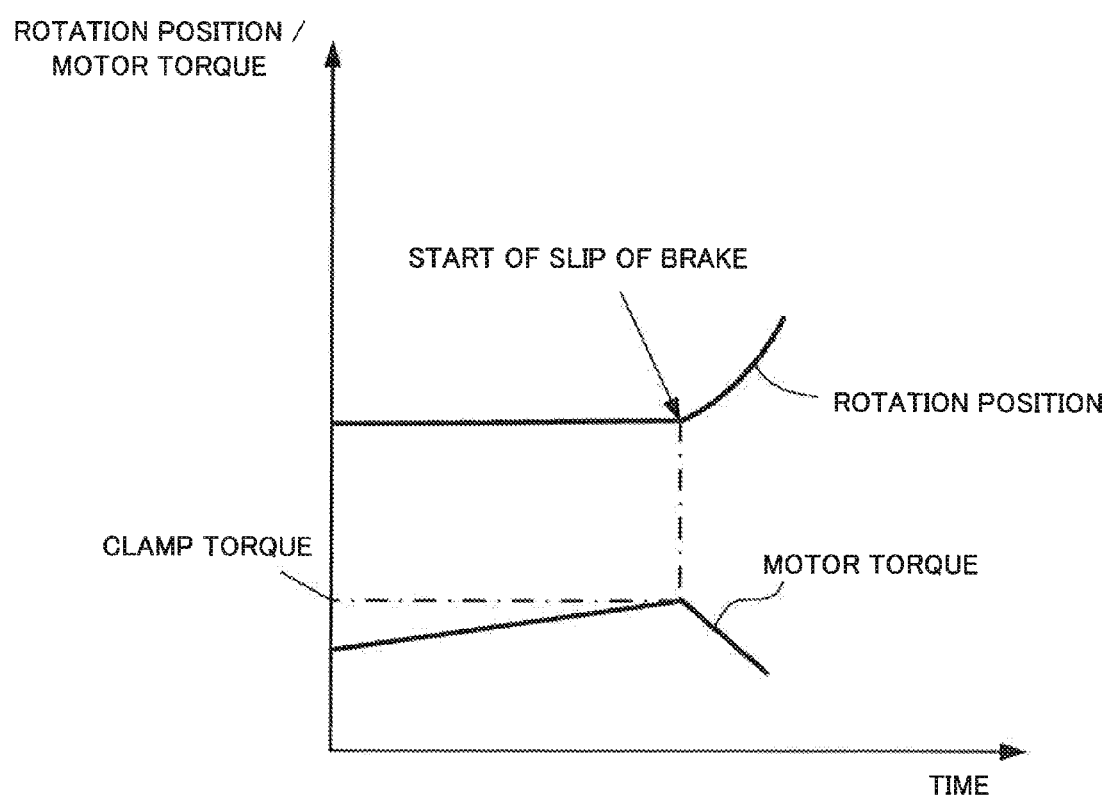
FIG. 2 is a diagram illustrating an example of detecting a slip of a clamp based on a rotation position.

A-1: Example of Detecting Slip of Clamp by Change in a Rotation Position (See FIG. 2)

In a state where the rotation shaft is clamped and fixed, a rotation instruction is transmitted to the rotation shaft so that a rotation torque is gradually applied thereto. At this time, since the rotation shaft is fixed by means of the clamp, the rotation position does not change. However, the rotation torque generated by the motor becomes higher than the clamp torque at a certain time point, so that a slip occurs in a clamp mechanism. At this time, the rotation position changes from the original position. When the torque generated by the motor at the changing point of rotation position is read, the clamp torque may be measured.

Figure 3:
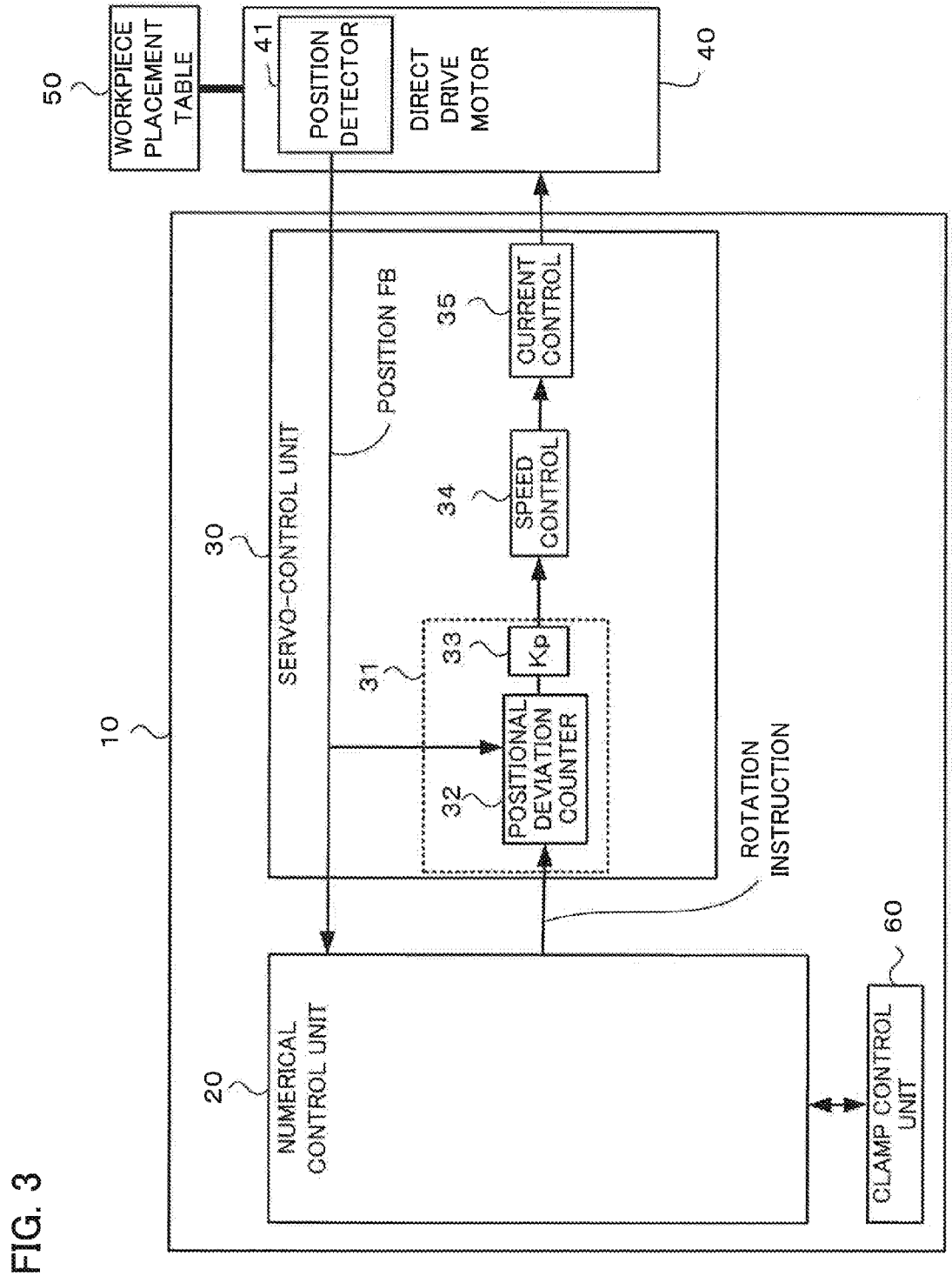
FIG. 3 is a block diagram illustrating a configuration that captures the slip of the fclamp by a change in rotation position in the rotation table equipped with a controller.

FIG. 3 is a block diagram illustrating a configuration of capturing the slip of the clamp by a change in rotation position in the rotation table equipped with a controller 10.

The rotation table includes a direct drive motor 40 that is connected to a workpiece placement table 50 and the controller 10 that controls the direct drive motor 40. The controller 10 includes a display device, an input device, and a storage device, which are not illustrated in the drawings.

The controller 10 includes a numerical control unit 20, a servo-control unit 30, and a clamp control unit 60. The servo-control unit 30 includes a position control unit 31 with a positional deviation counter 32 and a position loop gain 33, a speed control unit 34, and a current control unit 35. The position control unit 31 is used to perform the positioning control of the workpiece placement table 50 in accordance with the position instruction output from the numerical control unit 20. Such a configuration is provided in the controller of the rotation table.

The numerical control unit 20 outputs a rotation instruction to the servo-control unit 30, and outputs a clamp instruction or an unclamp instruction to the clamp control unit 60. The numerical control unit 20 inputs position feedback information (position FB) output from a position detector 41 provided in the direct drive motor 40.

The numerical control unit 20 transmits an instruction of clamping the rotation shaft of the direct drive motor 40 to the clamp control unit 60, and gradually applies a rotation instruction (a position instruction) with respect to the rotation shaft to the servo-control unit 30 in a state where the rotation shaft is fixed so as not to be rotatable. Furthermore, the clamp control unit 60 controls a piston driving unit (not illustrated) so that the piston 7a (see FIG. 1) performs a clamp operation.

At this time, since the rotation shaft is fixed by means of the clamp, the rotation position does not change. However, the rotation torque generated by the motor becomes higher than the clamp torque at a certain time point, so that a slip occurs in the clamp. At this time, the rotation position of the rotation shaft changes from the original position. The rotation position of the rotation shaft of the direct drive motor 40 is detected by the position detector 41, and the position FB output from the position detector 41 is input to the numerical control unit 20. The numerical control unit 20 can measure the clamp torque by reading the torque generated in the direct drive motor 40 at a changing point of rotation position. The clamp torque can be measured from, for example, the drive current of the direct drive motor 40.

A-2: Example of Detecting a Slip of a Clamp Based on Positional Deviation (See FIG. 4)

Figure 4:
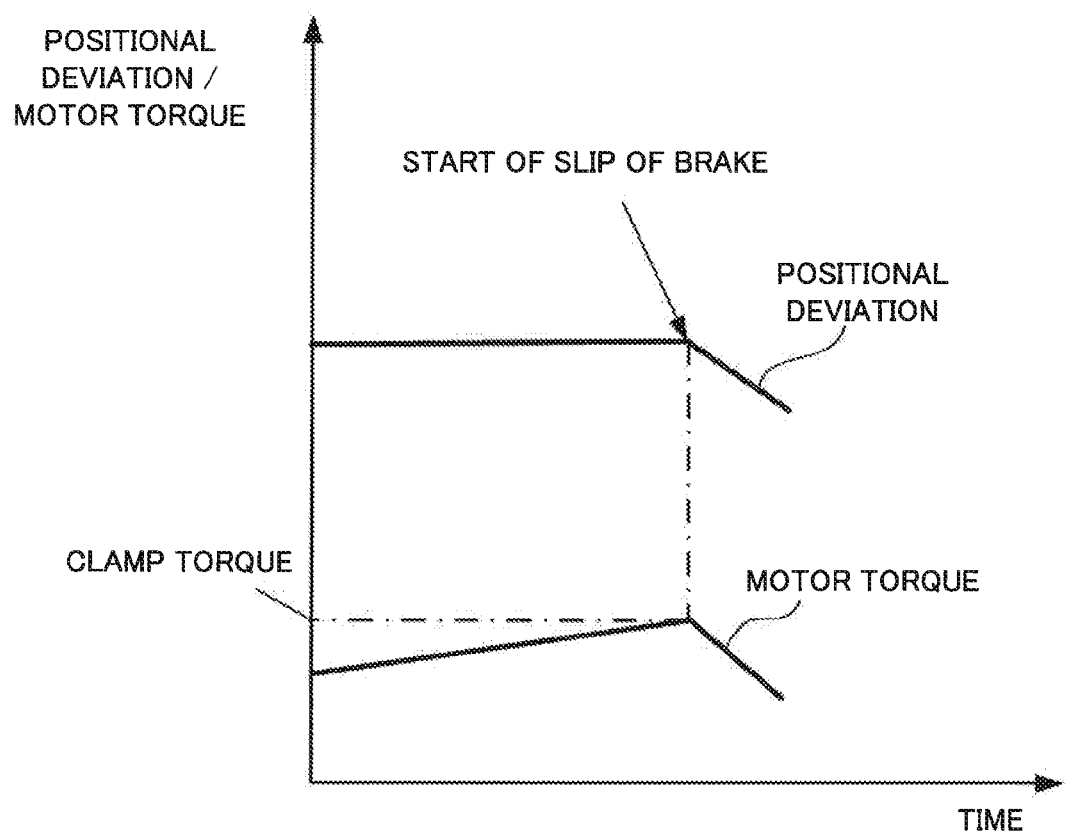
FIG. 4 is a diagram illustrating an example of detecting the slip of the clamp based on a positional deviation.

FIG. 4 is a diagram illustrating an example of detecting a slip of the clamp based on the positional deviation.

In a state where the rotation shaft is clamped and fixed, a rotation instruction (a position instruction) is gradually applied to the rotation shaft. At this time, since the rotation shaft is fixed by means of the clamp, the positional deviation gradually increases. However, the rotation torque generated by the motor becomes higher than the clamp torque at a certain time point, so that a slip occurs in the clamp mechanism. At this time, since the positional deviation that has gradually increased so far begins to decreases, it is possible to recognize the changing point of the positional deviation. When the torque generated by the motor at the changing point of this positional deviation is read, it is possible to measure the clamp torque.

Figure 5:
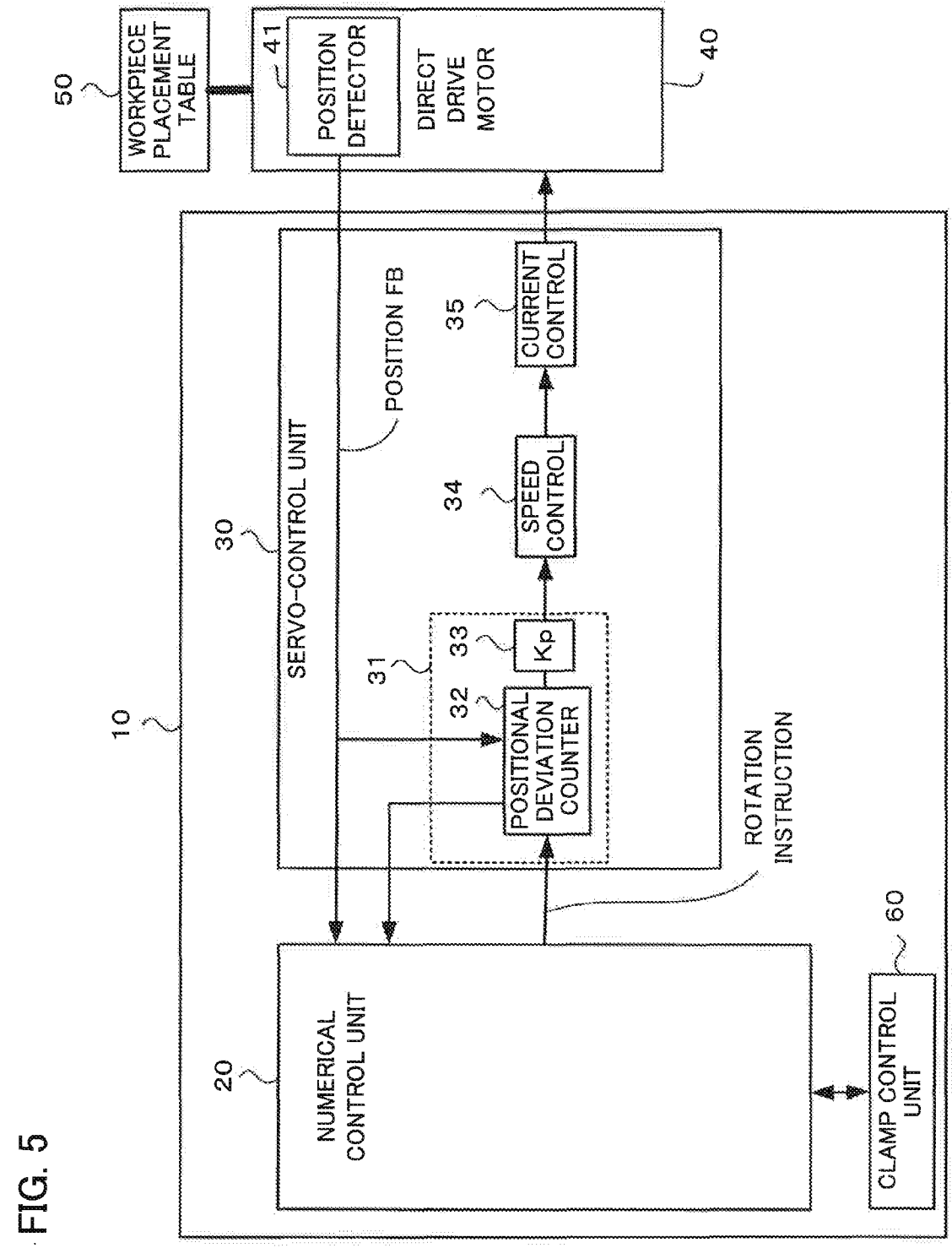
FIG. 5 is a block diagram illustrating a configuration of capturing the slip of the clamp by a change in positional deviation in the rotation table equipped with the controller.

FIG. 5 is a block diagram illustrating a configuration of capturing the slip of the clamp by a change in positional deviation in the rotation table equipped with the controller 10.

In the rotation table illustrated in FIG. 3, the torque of the direct drive motor 40 is read at the changing point of rotation position as described above. However, in the rotation table illustrated in FIG. 5, the torque of the direct drive motor 40 is read at the changing point of positional deviation.

As illustrated in FIG. 5, the servo-control unit 30 is equipped with the positional deviation counter 32, and the rotation instruction (the position instruction) output from the numerical control unit 20 and the position FB output from the position detector 41 detecting the rotation position of the rotation shaft of the direct drive motor 40 are input to the positional deviation counter 32. The positional deviation amount of the positional deviation counter 32 is transmitted to the numerical control unit 20 as a feedback (positional deviation FB).

The numerical control unit 20 transmits an instruction of clamping the rotation shaft of the direct drive motor 40 to the clamp control unit 60, and gradually applies the rotation instruction (the position instruction) with respect to the rotation shaft to the servo-control unit 30 in a state where the rotation shaft is fixed so as not to be rotatable. Furthermore, the clamp control unit 60 controls a piston driving unit (not illustrated) so that the piston 7a (see FIG. 1) performs a clamp operation.

Since the rotation shaft is fixed by means of the clamp based on the control of the numerical control unit 20 in a state where the clamp torque is measured, the rotation position does not change. However, the rotation torque generated by the motor becomes higher than the clamp torque at a certain time point, so that a slip occurs in the clamp. At this time, the rotation position changes from the original position. The rotation position of the rotation shaft of the direct drive motor 40 is detected by the position detector 41, and the position FB output from the position detector 41 is input to the positional deviation counter 32 of the servo-control unit 30. When the rotation shaft of the direct drive servo-motor 40 rotates, the position FB is output from the position detector 41 to the positional deviation counter 32 of the servo-control unit 30, so that the positional deviation amount of the positional deviation counter 32 changes.

The numerical control unit 20 can measure the clamp torque by reading the torque generated by the direct drive motor 40 at the changing point of the positional deviation amount that is fed back from the servo-control unit 30. The clamp torque can be measured from, for example, the drive current of the direct drive motor 40.

Figure 6:
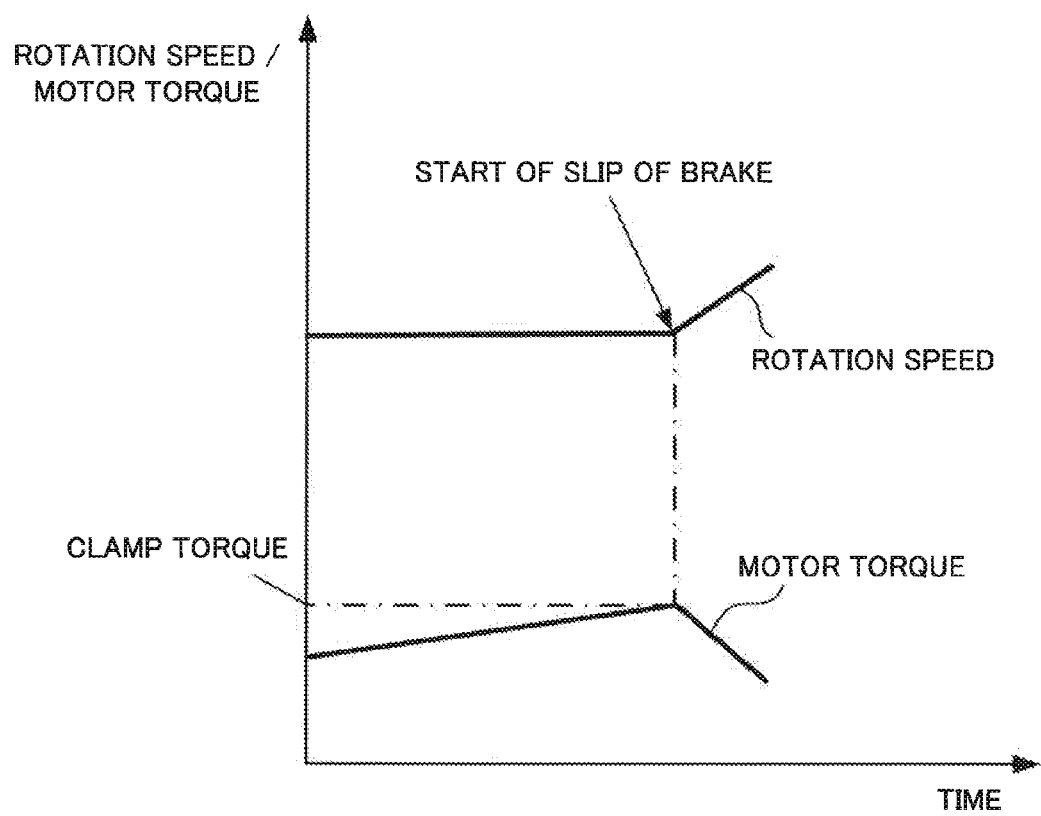
FIG. 6 is a diagram illustrating an example of detecting the slip of the clamp based on a rotation speed.

A-3: Example of Detecting a Slip of a Clamp Based on Rotation Speed (See FIG. 6)

In a state where the rotation shaft is clamped and fixed, the rotation instruction (the position instruction) is transmitted to the rotation shaft, so that the rotation instruction is gradually applied thereto. At this time, since the rotation shaft is fixed by means of the clamp, the rotation speed does not change. However, the rotation torque generated by the motor becomes higher than the clamp torque at a certain time point, so that a slip occurs in the clamp. At this time, the rotation speed changes. The clamp torque can be measured by reading the torque generated by the motor at the changing point of the rotation speed.

Figure 7:
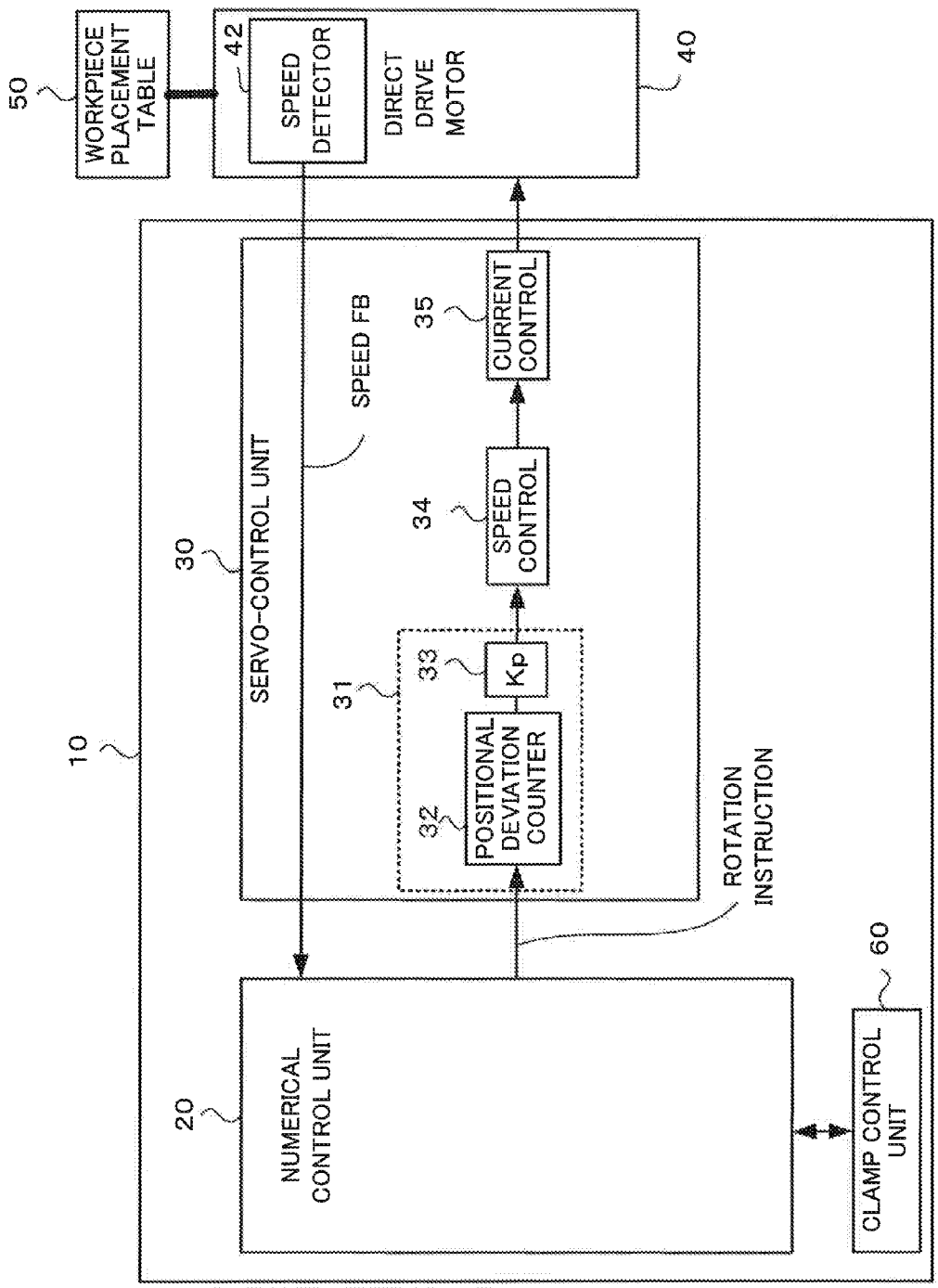
FIG. 7 is a block diagram illustrating a configuration of capturing the slip of the clamp by a change in rotation speed in the rotation table equipped with the controller.

FIG. 7 is a block diagram illustrating a configuration of capturing the slip of the clamp by a change in rotation speed in the rotation table equipped with the controller.

The above-described rotation table (Example of A-2) of FIG. 5 includes the position detector 41, and captures the slip of the clamp by a change in positional deviation. However, the rotation table illustrated in FIG. 7 includes a speed detector 42, instead of the position detector 41, and captures the slip of the clamp by a change in rotation speed by transmitting the output from the speed detector 42 to the numerical control unit 20 as feedback (the speed FB).

The numerical control unit 20 transmits an instruction of clamping the rotation shaft of the direct drive motor 40 to the clamp control unit 60, and gradually applies the rotation instruction (the position instruction) with respect to the rotation shaft to the servo-control unit 30 in a state where the rotation shaft is fixed so as not to be rotatable. Furthermore, the clamp control unit 60 controls a piston driving unit (not illustrated) so that the piston 7a (see FIG. 1) performs a clamp operation.

At this time, since the rotation shaft is fixed by means of the clamp, the rotation speed does not change (the rotation speed is 0 (zero)). However, the rotation torque generated by the motor becomes higher than the clamp torque at a certain time point, so that a slip occurs in the clamp. At this time, the rotation shaft starts to rotate and then the rotation speed thereof gradually increases. The rotation speed of the rotation shaft of the direct drive motor 40 is detected by the speed detector 42, and the speed FB output to the speed detector 42 is input to the numerical control unit 20. The numerical control unit 20 can measure the clamp torque by reading the torque generated by the direct drive motor 40 at the changing point of rotation position.

Figure 8:
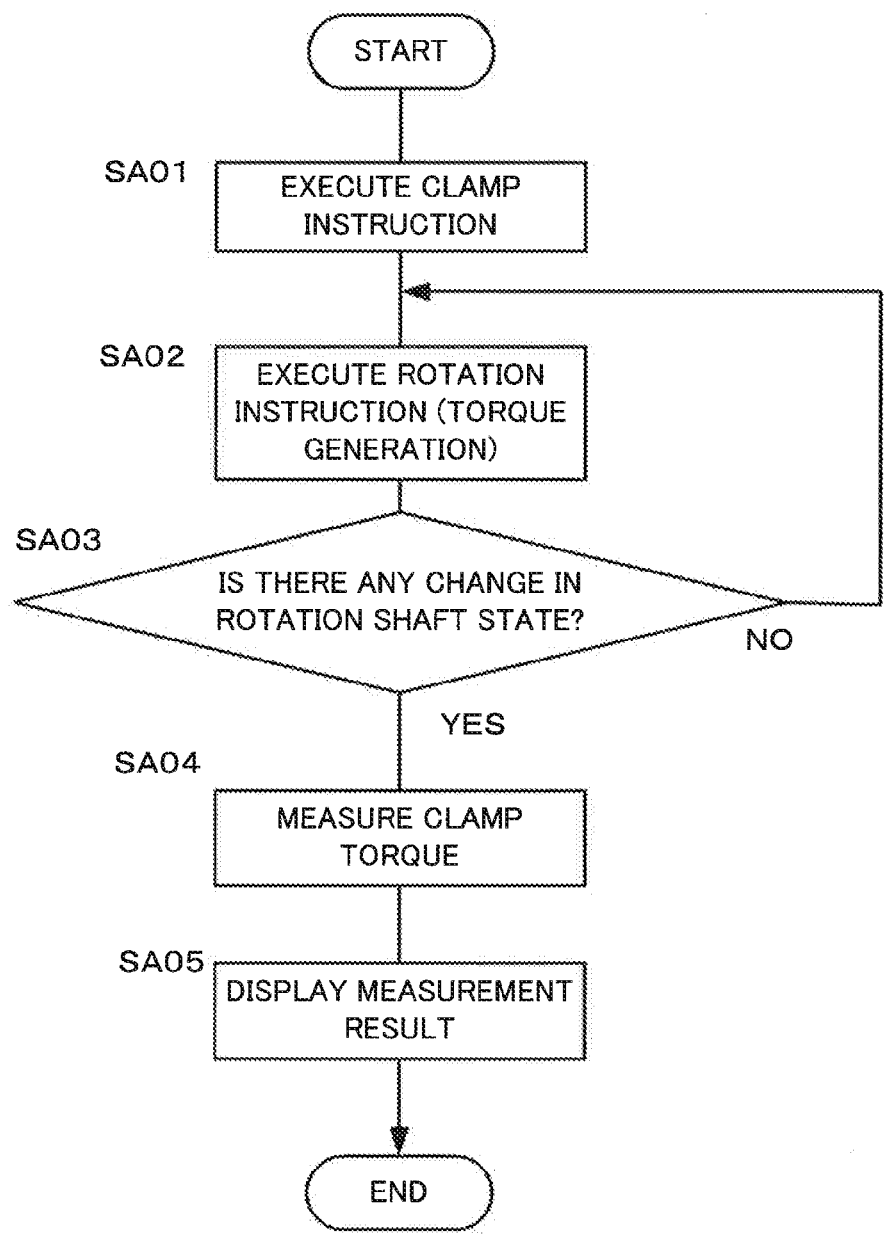
FIG. 8 is a flowchart illustrating a procedure of measuring a clamp torque.

FIG. 8 is a flowchart illustrating a procedure of measuring the clamp torque. Hereinafter, this process will be described according to the steps.

[step SA01] The clamp instruction is executed.

[step SA02] The rotation instruction (torque generation) is executed.

[step SA03] It is determined whether or not the "rotation shaft state" changes. If there is a change in rotation shaft state (YES), the routine proceeds to step SA04. If there is no change in rotation shaft state (NO), the routine returns to step SA02. In this case, when the routine returns from step SA03 to step SA02, the rotation instruction is given so that the torque for rotating the rotation shaft gradually increases. Here, the "rotation shaft state" is at least one of the rotation position, the positional deviation, and the rotation speed.

[step SA04] The clamp torque is measured. The magnitude of the clamp torque may be measured based on the drive current of the motor.

[step SA05] The measurement result of the clamp torque is displayed, and this process ends.

B: Second Embodiment

Figure 9:
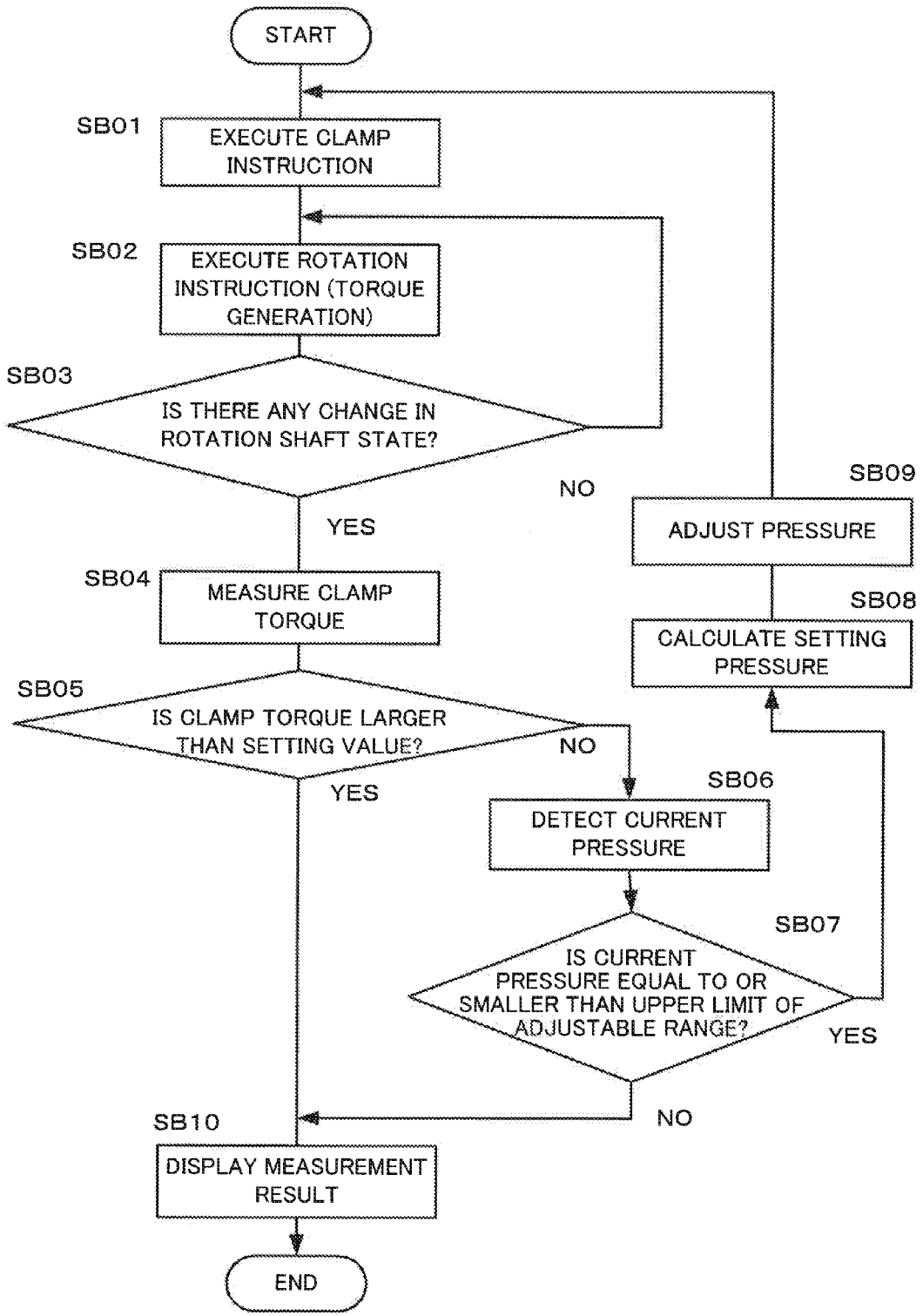
FIG. 9 is a flowchart illustrating a procedure of measuring the clamp torque and automatically adjusting the clamp torque based on the measurement result.

Embodiment of Measuring Clamp Torque and Automatically Adjusting Clamp Torque Based on Measurement Result FIG. 9 is a flowchart illustrating a process of measuring the clamp torque and automatically adjusting the clamp torque based on the measurement result. Hereinafter, this process will be described according to the steps.

[step SB01] The clamp instruction is executed.

[step SB02] The rotation instruction (torque generation) is executed.

[step SB03] It is determined whether or not the "rotation shaft state" changes. If there is a change in rotation shaft state (YES), the routine proceeds to step SB04. If there is no change in rotation shaft state (NO), the routine returns to step SB02. In this case, when the routine returns from step SB03 to step SB02, the rotation instruction is given so that the torque for rotating the rotation shaft gradually increases. Here, the "rotation shaft state" is at least one of the rotation position, the positional deviation, and the rotation speed.

[step SB04] The clamp torque is measured. The magnitude of the clamp torque may be measured based on the drive current of the motor.

[step SB05] It is determined whether or not the clamp torque is larger than the setting value. If the clamp torque is larger than the setting value (YES), the routine proceeds to step SB10. If the clamp torque is not larger than the setting value (NO), the routine proceeds to step SB06.

[step SB06] The current pressure of the generation source that generates the clamp torque is detected by the existing sensor provided in the clamp.

[step SB07] It is determined whether or not the current pressure detected in step SB06 is equal to or smaller than the upper limit of the adjustable range. If the current pressure is equal to or smaller than the upper limit of the adjustable range (YES), the routine proceeds to step SB08. If the current pressure is larger than the upper limit of the adjustable range (NO), the routine proceeds to step SB10.

[step SB08] The setting pressure is calculated. The pressure of the generation source that generates the clamp torque is increased by the amount corresponding to a difference between the value of the predetermined clamp torque and the value of the measured clamp torque.

[step SB09] The pressure of the generation source generating the clamp torque is adjusted to the setting pressure calculated in step SB08, and the routine returns to step SB01.

[step SB10] The clamp torque (the measurement result) measured in step SB04 is displayed, and this process ends.

Here, the above-described second embodiment will be described in detail. The clamp torque generation source is configured to use a pneumatic pressure (a hydraulic pressure), and includes a structure with an adjustment valve that changes the pneumatic pressure (the hydraulic pressure). For example, in a case where the pneumatic pressure or the hydraulic pressure is used in the clamp torque generation source, a mechanism is provided which increases the pressure of the pneumatic pressure or the hydraulic pressure so as to obtain a predetermined clamp torque. In a case where the pressure can not be improved even when the pressure is increased, the result is displayed.

According to the same procedure as that of the above-described first embodiment, the clamp torque is first measured, and the measured clamp torque is compared with the predetermined clamp torque (the target value). When the measured clamp torque is found to be lower than the predetermined clamp torque, as a result of comparison, a process of increasing the clamp torque is executed. It is checked whether the use pressure at this time point is within the upper limit of the adjustable pressure range or not.

When the use pressure (for example, 0.5 MPa) at the above-described time point is within the upper limit (for example, 1.0 MPa) of the adjustable pressure range, the pressure is increased by the amount corresponding to the difference (500−400=100 N·m) between the predetermined clamp torque (for example, 500 N·m) and the measured clamp torque (for example, 400 N·m).

Then, the clamp torque is measured again, and it is determined whether the measured clamp torque reaches the predetermined clamp torque or not. This process is repeated until the measured clamp torque reaches the predetermined clamp torque.

However, in a case where the measured clamp torque does not reach the predetermined clamp torque even when the setting pressure reaches the upper limit of the adjustable pressure range, this process is finished, and the clamp torque measurement result is displayed.

In this way, since the clamp torque can be increased by automatically adjusting the pressure even when the clamp torque decreases with the degradation of the clamp mechanism, the maintenance timing may be extended, and hence a state where the machine tool suddenly stops may be prevented.

As described above, in the embodiment of the present invention, since a particular device for measuring the clamp torque is not needed because information for detecting the rotation shaft state and the rotation torque of the motor is used, the clamp torque can be measured without removing the workpiece or the machining jig mounted on the rotation table. Further, when the clamp torque is low, the sudden stop of the machine tool can be prevented by increasing the clamp torque, and hence the maintenance timing can be delayed. Further, the degradation state of the clamp mechanism can be recognized by the measurement of the clamp torque.

The invention claimed is:

1. A rotation table comprising:
   a workpiece placement table;
   a motor of which one end of a rotation shaft is connected with the workpiece placement table and the other end thereof is equipped with a detector for detecting the rotation shaft state;
   a clamp mechanism that holds the workpiece placement table at a stop position;
   a rotation instruction unit that generates a rotation torque in the motor;
   a state monitoring unit that monitors a change in rotation shaft state based on the rotation shaft state information output from the detector; and
   a measurement unit that transmits a rotation instruction to the motor in a state where the workpiece placement table is clamped by the clamp mechanism and measures a clamp torque based on motor torque information in accordance with the rotation instruction and a change in rotation shaft state.

2. The rotation table according to claim 1,
   wherein the detector is a position detector, the state monitoring unit monitors a change in the rotation position of the rotation shaft, and the measurement unit measures the clamp torque based on the motor torque information in accordance with the rotation instruction when the rotation position of the rotation shaft changes.

3. The rotation table according to claim 1,
   wherein the detector is a position detector, the state monitoring unit monitors a change in the rotation positional deviation of the rotation shaft, and the measurement unit measures the clamp torque based on the motor torque information in accordance with the rotation instruction when the rotation positional deviation of the rotation shaft decreases.

4. The rotation table according to claim 1,
   wherein the detector is a speed detector, the state monitoring unit monitors a change in the rotation speed of the rotation shaft, and the measurement unit measures the clamp torque based on the motor torque information in accordance with the rotation instruction when the rotation speed of the rotation shaft changes.

5. The rotation table according to claim 1, further comprising:

an adjustment valve that adjusts a pneumatic pressure and/or a hydraulic pressure for adjusting the clamp torque based on the clamp torque measurement result of the measurement unit.

* * * * *